(12) United States Patent
Kurayoshi et al.

(10) Patent No.: US 6,889,789 B2
(45) Date of Patent: May 10, 2005

(54) SEAT RAIL STRUCTURE

(75) Inventors: Yoshiyuki Kurayoshi, Saitama (JP); Satoshi Hirayanagi, Saitama (JP); Shin Watanabe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/649,827

(22) Filed: Aug. 28, 2003

(65) Prior Publication Data
US 2004/0124024 A1 Jul. 1, 2004

(30) Foreign Application Priority Data
Sep. 10, 2002 (JP) ........................................ 2002-264056

(51) Int. Cl.[7] .............................................. B62K 11/02
(52) U.S. Cl. ..................................... 180/219; 297/195.1
(58) Field of Search ......................... 180/219; 297/195.1

(56) References Cited

U.S. PATENT DOCUMENTS

| | | | | |
|---|---|---|---|---|
| 5,172,788 A | * | 12/1992 | Fujii et al. ................... | 180/219 |
| 5,330,028 A | * | 7/1994 | Handa et al. ................. | 180/219 |
| 5,480,001 A | * | 1/1996 | Hara ............................ | 180/227 |
| 6,296,163 B1 | * | 10/2001 | Kitao et al. .................. | 224/401 |
| 2002/0135209 A1 | * | 9/2002 | Kajikawa et al. .......... | 296/203.01 |

FOREIGN PATENT DOCUMENTS

JP 02246890 A 10/1990

* cited by examiner

*Primary Examiner*—Kevin Hurley
(74) *Attorney, Agent, or Firm*—Birch, Stewart, Kolasch & Birch, LLP

(57) ABSTRACT

A seat rail extending rearwardly from a vehicle body frame to support a seat. The seat rail is formed of a left-and-right two-split cast product having a substantially flat upper surface and, at the same time, includes cross members. These cross members can be mounted later using bolts. The seat can be arranged above the seat rail and the cross members and, at the same time, a seat engaging member which engages the seat with the cross member can be formed on the cross member. The seat rail is constituted of the left and right seat rails which are divided with respect to a vehicle width center. This seat rail structure provides for simple manufacture and assembly.

19 Claims, 11 Drawing Sheets

SEAT RAIL STRUCTURE

CROSS-REFERENCE TO RELATED APPLICATION

The present application claims priority under 35 U.S.C. §119 to Japanese Patent Application No. 2002-264056, filed Sep. 10, 2002, the entire contents of which are hereby incorporated by reference.

BACKGROUND OF THE INVENTION

1. Field of the Invention

The present invention relates to an improved technique of a seat rail structure of a motorcycle.

2. Description of Background Art

In a motorcycle, there has been known the seat rail structure which extends rearward from a vehicle body frame to support a seat (for example, see patent literature of JP-B-7-64302 (page 2 to 3, FIG. 1).

According to the JP-B-7-64302, in the conventional seat rail structure, a seat rail is mounted on a rear portion of a vehicle body frame by fastening using bolts.

The conventional seat rail adopts a three-dimensional skeletal structural body which spans left and right rail portions with a plurality of cross members, and is formed of any one of the pipe welded structure, the plate welded structure or the cast structure. Hence, it is difficult to manufacture the seat rail.

SUMMARY AND OBJECTS OF THE INVENTION

Accordingly, it is an object of the present invention to provide a technique which can facilitate manufacturing of a seat rail.

To achieve the above-mentioned object, in a first aspect of the present invention, a seat rail extends rearward from a vehicle body frame for supporting a seat, the seat rail is formed of a left-and-right two-split cast product having a substantially flat upper surface, the seat rail includes at least one cross member, the cross member can be mounted later using fastening members such as bolts, the seat is arranged above the seat rail and the cross member, and a seat engaging member for engaging the seat is formed on the cross member.

Since the seat engaging member is formed on the cross member, it is no longer necessary to form the seat engaging member on the seat rail. Accordingly, the shape of the seat rail can be simplified and hence, molding by casting is facilitated. By forming the seat rail as a cast product, a left-and-right two-split seat rail can be easily manufactured.

On the other hand, the cross member is provided with only the seat engaging member and hence, the shape of the cross member can be simplified. Accordingly, the cross member can be formed of a press molded product having a simple shape and hence, the cross member can be easily manufactured.

In this manner, the left-and-right two-split seat rail and the cross member which can be easily manufactured can be combined and integrally formed using fastening members and hence, the seat rail can be produced more easily.

According to a second aspect of the present invention, the seat rail is constituted of left and right seat rails which are divided with respect to a vehicle-width-direction center.

Since the left and right seat rails can be molded using a split mold which can be respectively divided in the vehicle body width direction, molding can be performed more easily.

According to a third aspect of the present invention, a heat shielding plate for engine exhaust muffler overlaps the seat rail from above, a seat mounting member which mounts the seat thereon or the cross member overlaps the heat shielding plate for engine exhaust muffler from above, and the heat shielding plate for engine exhaust muffler, the seat mounting member and the cross member are fastened to the seat rail by bolts.

Since the heat shielding plate for engine exhaust muffler and the seat mounting member are fastened to the seat rail using bolts in an overlapping manner and the heat shielding plate for engine exhaust muffler and the cross member are fastened to the seat rail using bolts in an overlapping manner, the heat shielding plate, the seat mounting member and the cross member can be assembled to the seat rail with a simple operation whereby the assembling operability is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the attached drawings, "front", "rear", "left", "right", "up" and "down" are directions as viewed from a driver.

Figure 1:
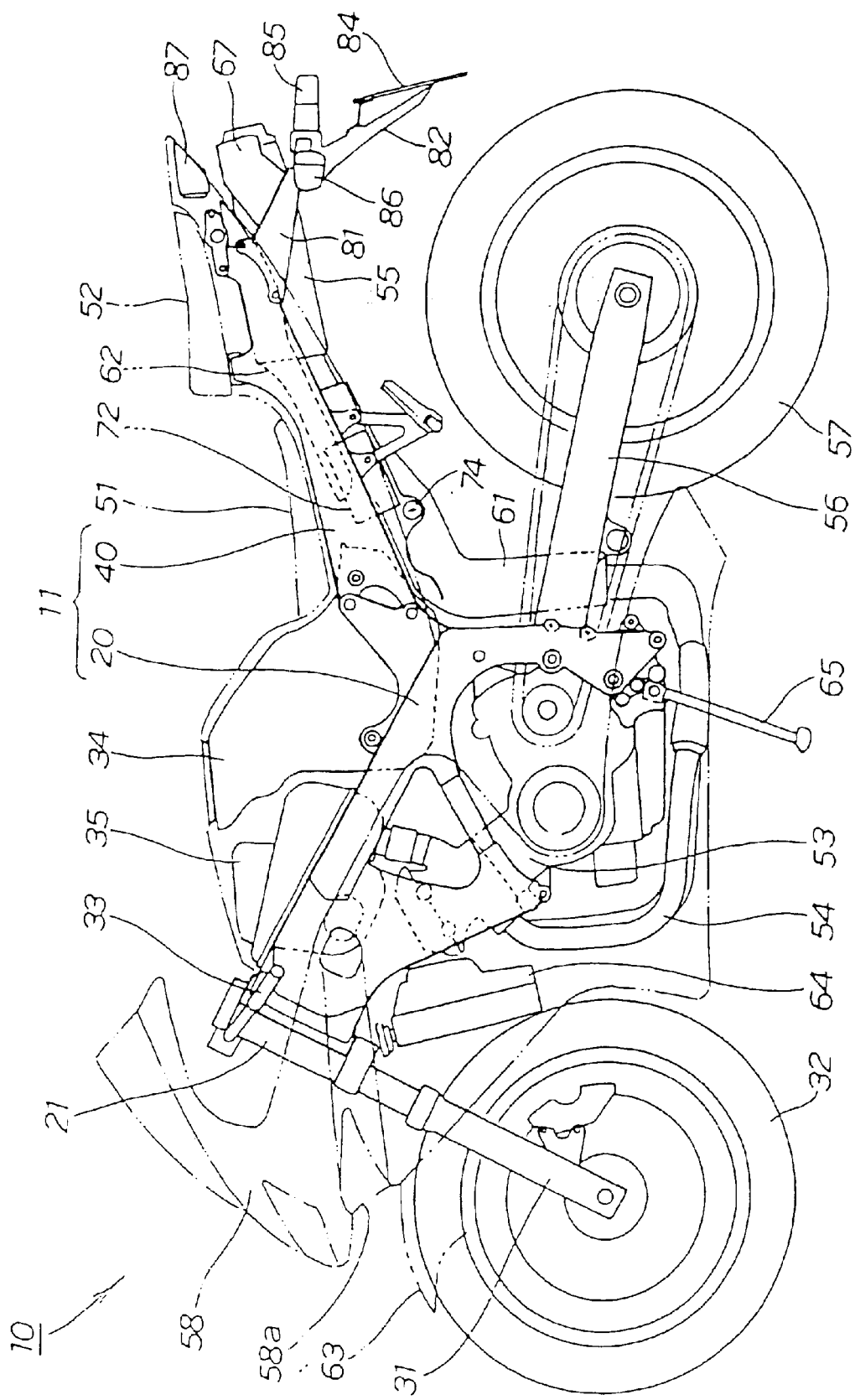
FIG. 1 A left side view of a motorcycle according to the invention.

FIG. 1 is a left side view of a motorcycle according to the invention. The motorcycle 10 includes, as main constitutional members thereof, a cradle-type vehicle body frame 20, a front fork 31 which is mounted on a head pipe 21 of the vehicle body frame 20, a front wheel 32 which is mounted on the front fork 31, a handle 33 which is connected to the front fork 31, a fuel tank 34 and an air chamber 35 which are mounted on an upper portion of the vehicle body frame 20, a seat rail 40 which extends rearward from the vehicle body frame 20, and a front seat 51 and a rear seat 52 which are mounted on the seat rail 40. A four cycle engine 53 is arranged in the inside of a cradle space of the vehicle body frame 20, a muffler 55 is connected to an exhaust port of the engine 53 by way of an exhaust pipe 54, a swing arm 56 is suspended by a rear cushion (not shown in the drawing) at a rear portion of the vehicle body frame 20, and a rear wheel 57 is mounted on the swing arm 56. The motorcycle is a vehicle of full cowling type which covers the vehicle body 11 with a cowl 58 indicated by an imaginary line.

The vehicle body 11 is comprised of the vehicle body frame 20 and the seat rail 40. The seat rail 40 is a rear frame which supports a seat (front and rear seats 51, 52). A driver can sit on the front seat 51 and a fellow-passenger can ride on the rear seat 52.

The exhaust pipe 54 is a metal pipe which extends to a rear portion of the vehicle body frame 20 below the engine 53 from an exhaust port provided to a front portion of the engine 53, extends upward from a rear end of extending exhaust pipe 54 along the vehicle body frame 20, and extends from an upper end of the extending exhaust pipe 54 to the muffler 55 along the seat rail 40. Also shown are a heat shielding pipe 61 which covers the exhaust pipe 54, a heat shielding plate 62 which covers an upper portion of the muffler 55, and a protector 67 which covers left, right and rear portions of the muffler 55. The protector 67 is a protecting plate which is mounted on stays 81 which are provided for mounting a rear fender 82.

In this manner, in the motorcycle 10, the front wheel 32, the engine 53, the rear wheel 57 are arranged on the vehicle body 11 in this order, the exhaust pipe 54 extends rearward from the engine 53 and the muffler 55 is provided to a rear end of the exhaust pipe 54. Further, the muffler 55 is arranged at the rear portion of the vehicle body frame 20, between left and right seat rails of the seat rail 40, and above the rear wheel 57.

Also shown are a front fender 63, a radiator 64, and a stand 65.

Figure 2:
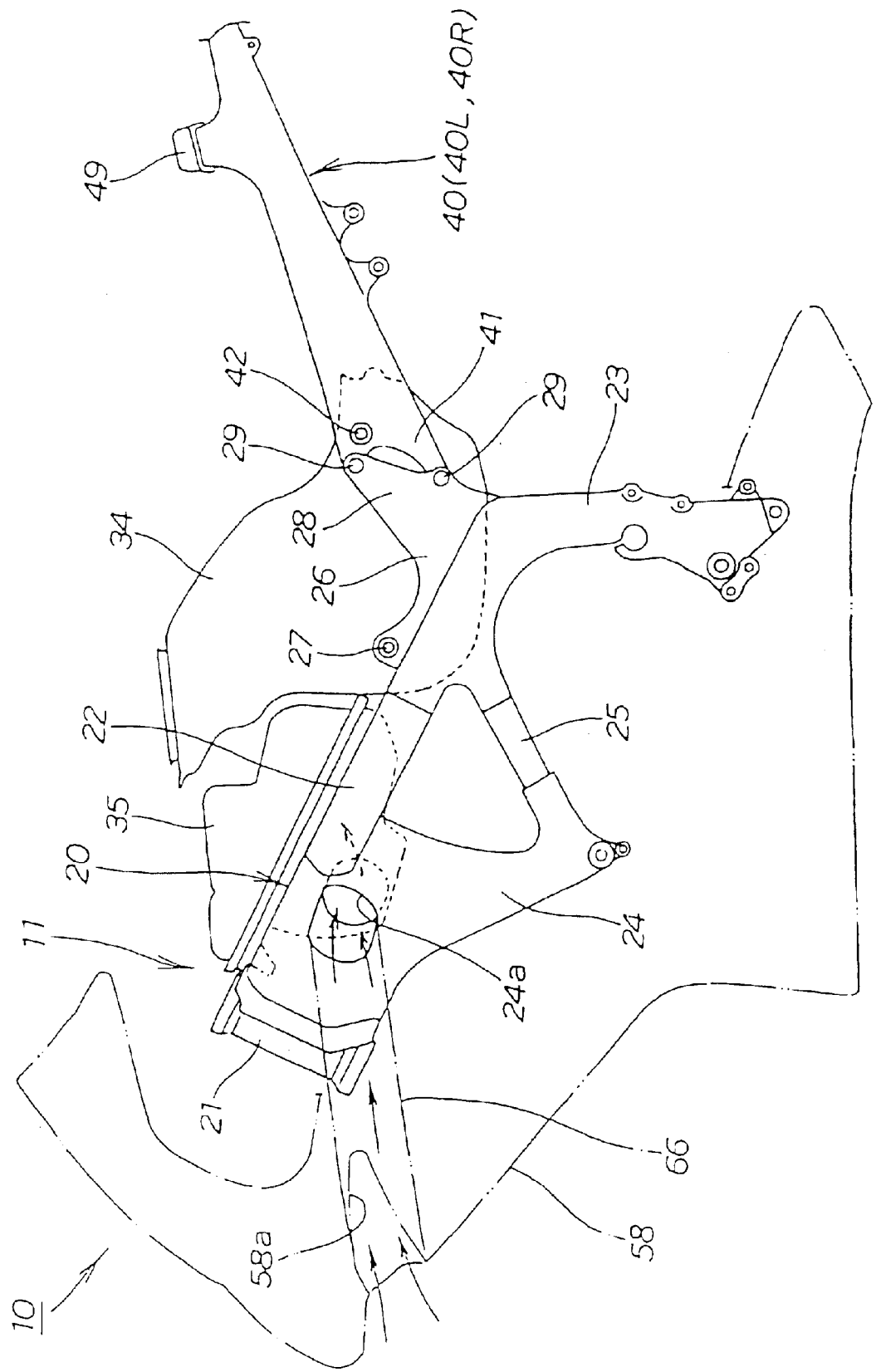
FIG. 2 A left side view of a vehicle body according to the invention.
Figure 3:
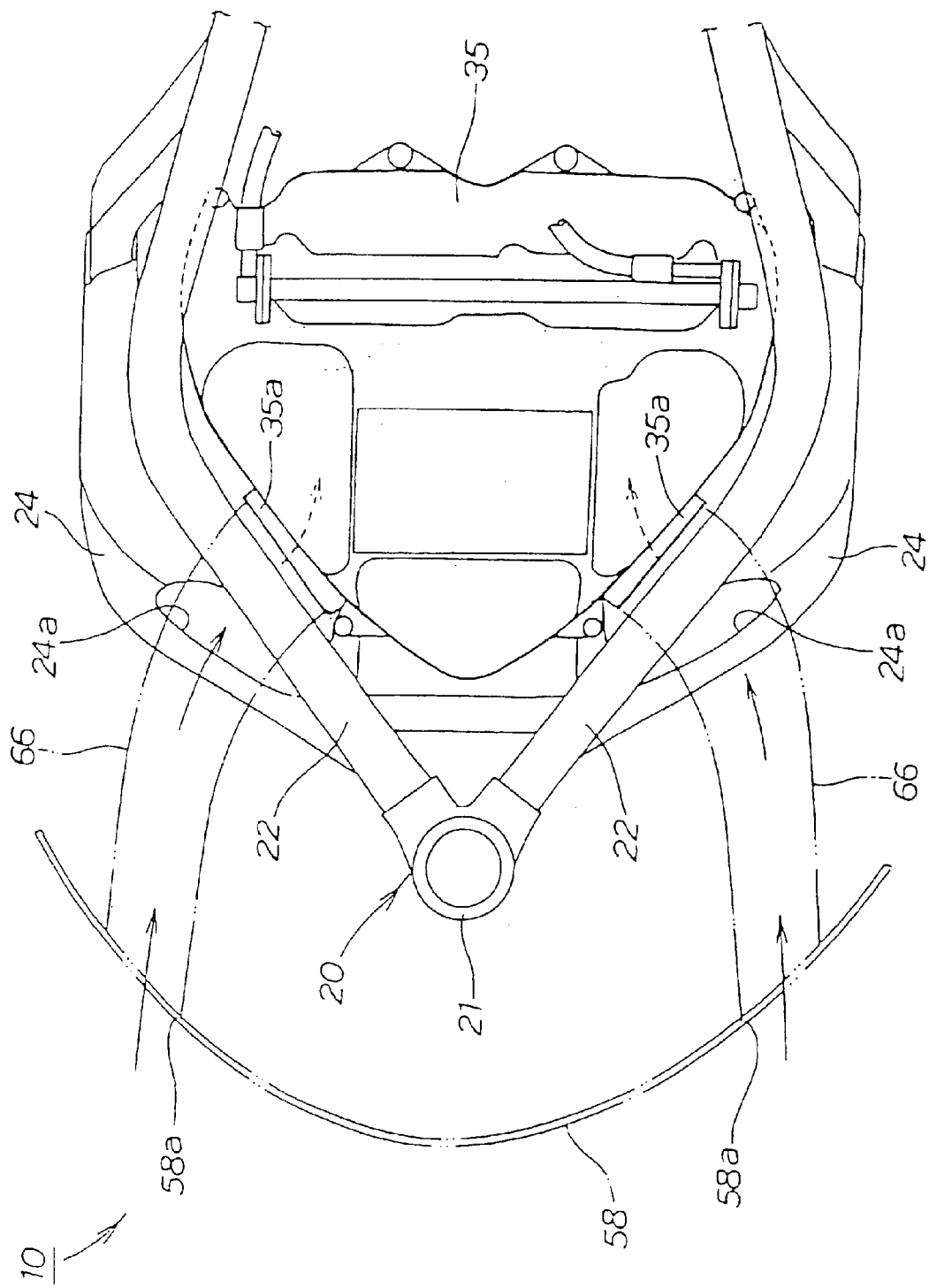
FIG. 3 A plan view of the vehicle body according to the invention.

FIG. 2 is a left side view of the vehicle body according to the invention, and FIG. 3 is a plan view of the vehicle body according to the invention. In FIG. 2 and FIG. 3, the vehicle body frame 20 includes a head pipe 21, left and right main frames 22, 22 which extend rearward from the head pipe 21, and left and right center frames 23, 23 which extend downward from rear ends of the main frames 22, 22 (only the left being shown in this drawing, the same going for the description hereinafter). Also shown are head pipe 21, left and right down frames 24, 24 which extend rearward and downward from front portions of the main frames 22, 22, left and right upper frames 25, 25 which extend from lower ends of the down frames 24, 24 to rear portions of the main frames 22, 22, and a plurality of cross members (not shown in the drawing). Some or all of these frame constitutional members are cast products.

The down frames 24, 24 have left and right through holes 24a, 24a which penetrate front portions thereof to make the inside and the outside thereof communicate with each other. These through holes 24a, 24a allow intake pipes 66, 66 indicated by an imaginary line to pass therethrough. The intake pipes 66, 66 are provided for connecting intake ports 35a, 35a of the air chamber 35 to air intake ports 58a, 58a formed in a front portion of the cowl 58. Further, the through holes 24a, 24a can be also used as portions of intake pipes 66, 66.

Here, the vehicle body frame 20 is configured such that the left and right brackets 26, 26 extend upward from rear upper portions of the left and right main frames 22, 22. The left and right brackets 26, 26 constitute support members which form fuel tank support portions 27, 27 at front portions thereof and seat rail mounting portions 28, 28 at rear portions thereof. By mounting the seat rail 40 to the seat rail mounting portions 28, 28 using bolts 29, it is possible to extend the seat rail 40 rearward from the rear upper portion of the vehicle body frame 20. The fuel tank support portions 27, 27 are through holes penetrating in the vehicle width direction.

Figure 4:
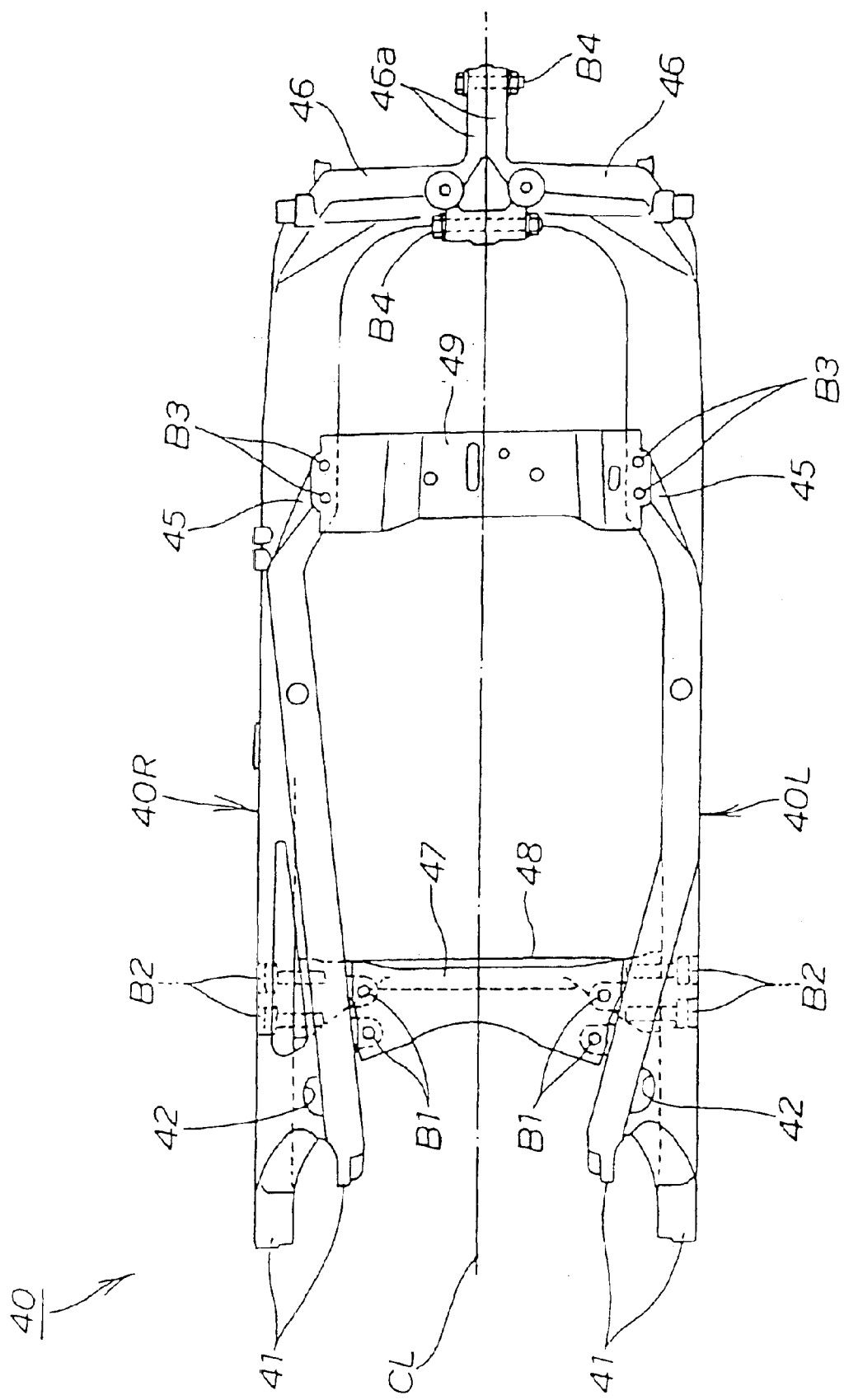
FIG. 4 A plan view of a seat rail according to the invention.
Figure 5:
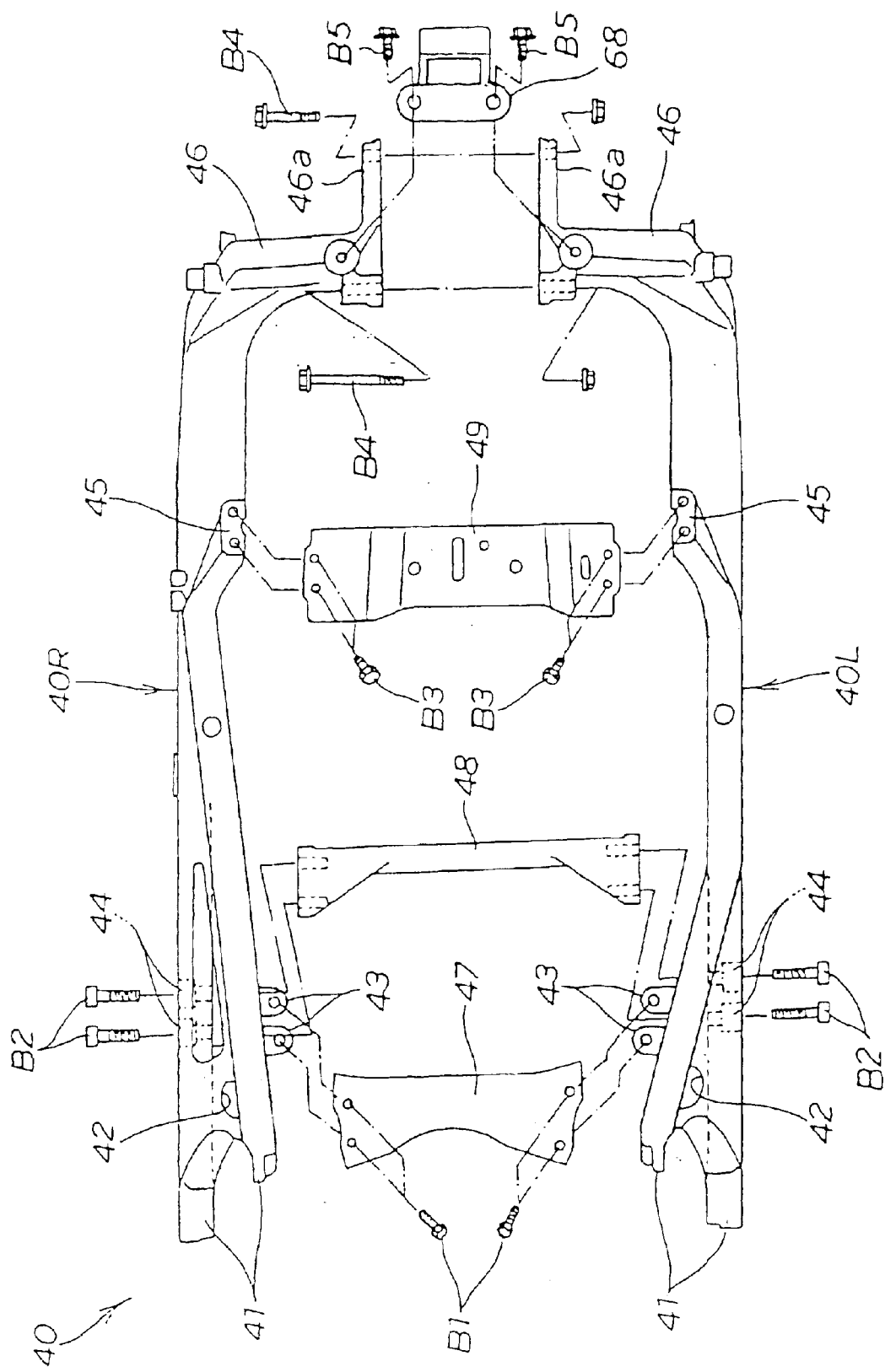
FIG. 5 An exploded view of the seat rail according to the invention.

FIG. 4 is a plan view of the seat rail according to the invention, and FIG. 5 is an exploded view of the seat rail according to the invention.

The seat rail 40 is constituted of a left seat rail 40L and a right seat rail 40R which are divided with respect to a vehicle width direction center CL. Three cross members, that is, a front upper cross member 47, a front lower cross member 48 and a rear cross member 49 span a distance between the left and right seat rails 40L, 40R in order rearward from the front portion of the seat rail 40.

The left and right seat rails 40L, 40R are left and right two-split cast products having substantially flat upper and lower surfaces. That is, the left and right seat rails 40L, 40R have the vehicle-width-direction surfaces (upper and lower surfaces) thereof formed into substantially flat surfaces to enable casting using split molds which can be respectively divided in the vehicle width direction at the time of casting.

Such left and right seat rails 40L, 40R are formed by integrally assembling the rail mounting portions 41 of front end portions (left side in the drawing), fuel tank support portions 42, 42 which are formed behind the rail mounting portions 41, front upper connection portions 43, 43 and front lower connection portions 44, 44 which are formed behind the fuel tank support portions 42, 42, rear connection portions 45, 45 which are formed behind the front lower connection portions 44, 44, extension portions 46, 46 which extend toward the vehicle-width-direction center CL from the rear end portions (right side in the drawing), and flanges 46a, 46a which make distal end portions thereof abut on each other. The fuel tank support portions 42, 42 are through holes penetrating in the vehicle width direction.

(1) The front upper cross member 47 overlaps between the front upper connection portions 43, 43 from above and is assembled to the front upper connection portions 43, 43 by fastening members B1 such as bolts, (2) both ends of the front lower cross member 48 are sandwiched between the front lower connection portions 44, 44 and are assembled to the front lower connection portions 44, 44 using fastening members B2 such as bolts, and (3) the rear cross member 49 is overlapped to the rear connection portions 45, 45 from above and is assembled to the rear connection portions 45, 45 using fastening members B3 such as bolts, and (4) the flanges 46a, 46a are abutted to each other and are assembled to each other by fastening members B4 such as bolts. As a result, the left and right seat rails 40L, 40R can be assembled to each other.

In this manner, the seat rail 40 is formed of the cast product having a substantially flat upper surface and includes at least one of cross members 47 to 49, wherein the cross members 47 to 49 can be mounted later using the fastening members B1 to B4 such as bolts.

Here, as shown in FIG. 5, a hook plate 68 (a seat mounting member 68) which is formed of a plate material can be mounted later on the extension portions 46, 46 using fastening members B5, B5 such as bolts. The hook plate 68 is a member for mounting a rear portion of the rear seat 52 (see FIG. 1).

Figure 6:
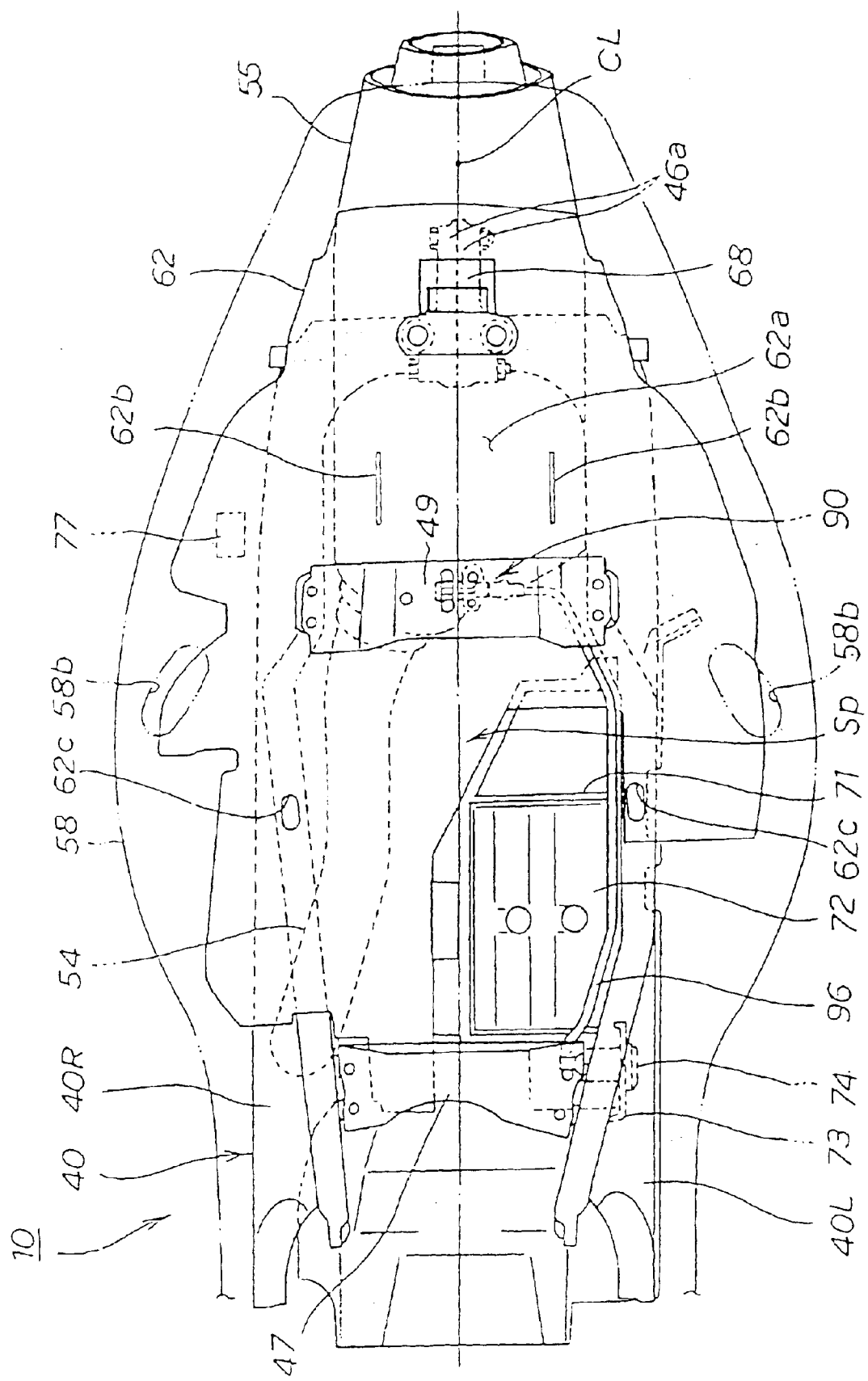
FIG. 6 A plan view of an essential part of a rear portion of the vehicle body according to the invention.
Figure 7:
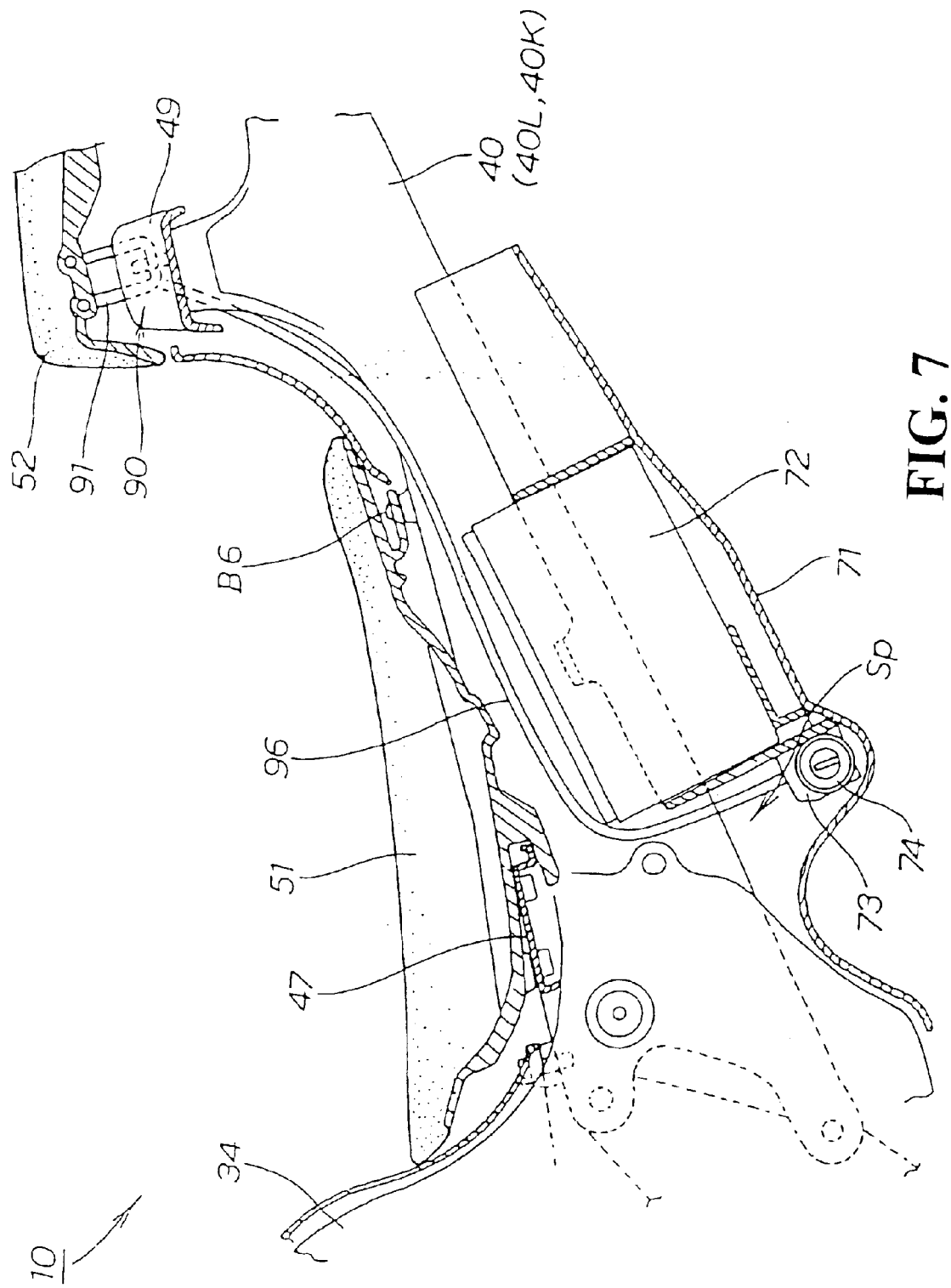
FIG. 7 A cross-sectional view viewing the vicinity of a front seat according to the invention from the left side.

FIG. 6 is a plan view of an essential part of the rear portion of the vehicle body according to the invention, and FIG. 7 is a cross-sectional view for viewing the periphery of the front seat according to the invention from the left side direction.

FIG. 6 shows that the muffler 55 is arranged between the left and right seat rails 40L, 40R (left and right rear frames 40L, 40R), a rear portion of the exhaust pipe 54 is connected to the muffler 55 after being arranged close to the right seat rail 40R so as to sufficiently ensure a space Sp for placing vehicle mounting parts such as a battery 72 and a key cylinder 74, for example, between the rear portion of the exhaust pipe 54 and the left seat rail 40L.

The key cylinder 74 is a member which opens or closes a seat locking mechanism 90 for replaceably engaging the rear seat 52 (see FIG. 7) to the rear portion of the vehicle body frame 20.

In this manner, since the vehicle mounting parts 72, 74 can be arranged by effectively making use of the space Sp opposite to the exhaust pipe 54, the thermal influence of the exhaust pipe 54 can be kept to a minimum. Accordingly, mounting of the vehicle mounting parts 72, 74 to the motorcycle 10 can be further facilitated. Further, this configuration prevents the motorcycle 10 from becoming large-sized.

To explain the above in detail, an electric component housing box 71 which is arranged in the space Sp disposed below the front seat 51 is mounted on the seat rail 40, the battery 72 is stored in the upper open-ended electric component housing box 71, and a stay 73 is formed on a front lower portion of the electric component housing box 71, and the key cylinder 74 is mounted on the stay 73.

It is possible to easily ensure a space for arranging the key cylinder 74 at a position where the thermal influence of the exhaust pipe 54 is small.

Further, since it is possible to surround the battery 72 with the electric component housing box 71 and to surround the key cylinder 74 with the stay 73, thermal influence of the exhaust pipe 54 can be further eliminated.

The cowl 58 indicated by an imaginary line in FIG. 6 includes traveling wind introducing holes 58b, 58b at rear left and right portions thereof. A liquid quantity in a reservoir tank 77 for a rear brake arranged in the inside of the cowl 58 can be confirmed through the traveling wind introducing hole 58b by the naked eye.

Accordingly, it is unnecessary to form a separate confirmation hole for confirming the liquid quantity of the reservoir tank 77 for the rear brake in the cowl 58. Further, since the reservoir tank 77 for the rear brake is arranged in the inside of the cowl 58, the aesthetic appearance of the motorcycle 10 is enhanced.

Figure 8:
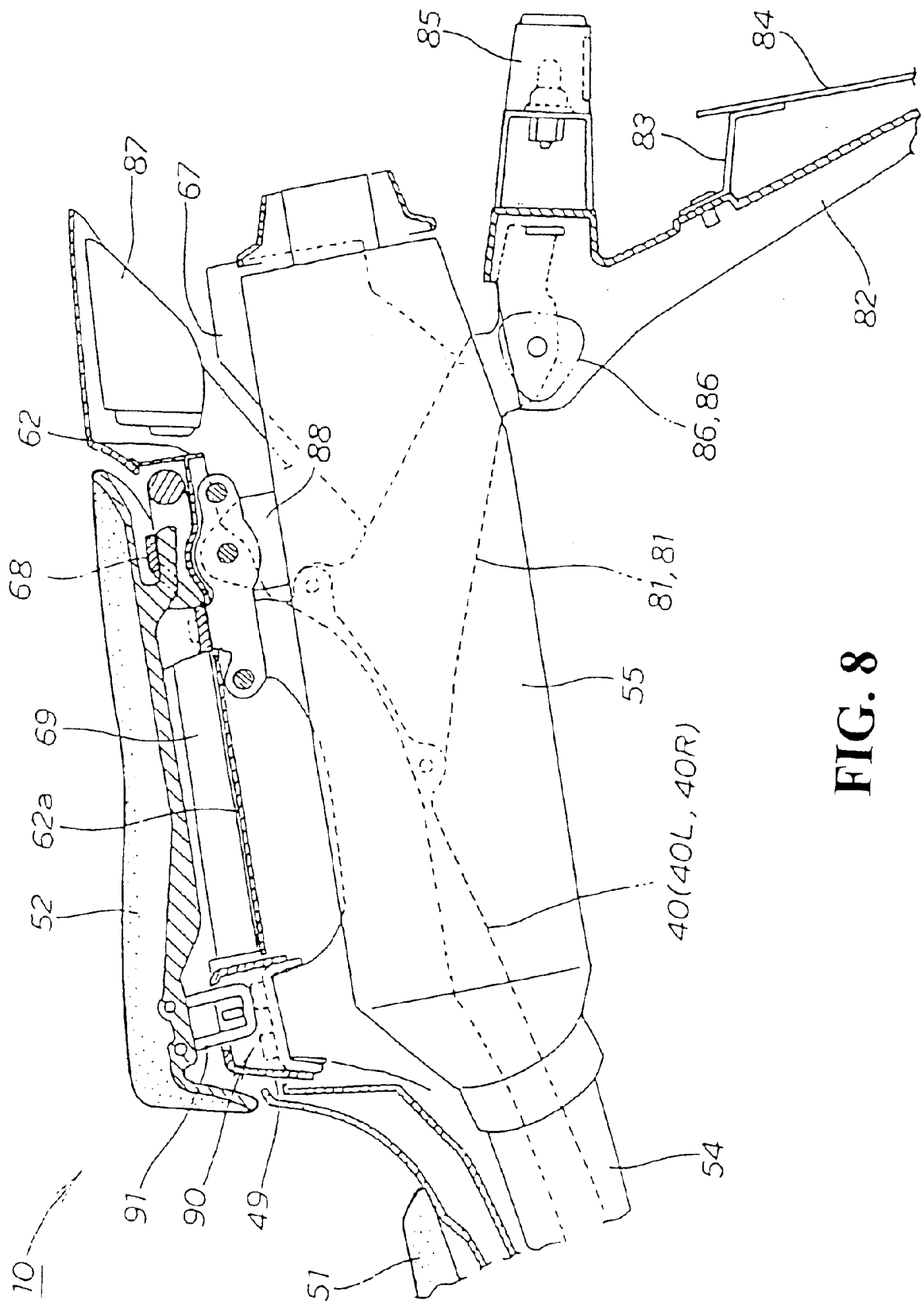
FIG. 8 A cross-sectional view viewing the vicinity of a rear seat according to the invention from the left side.
Figure 9:
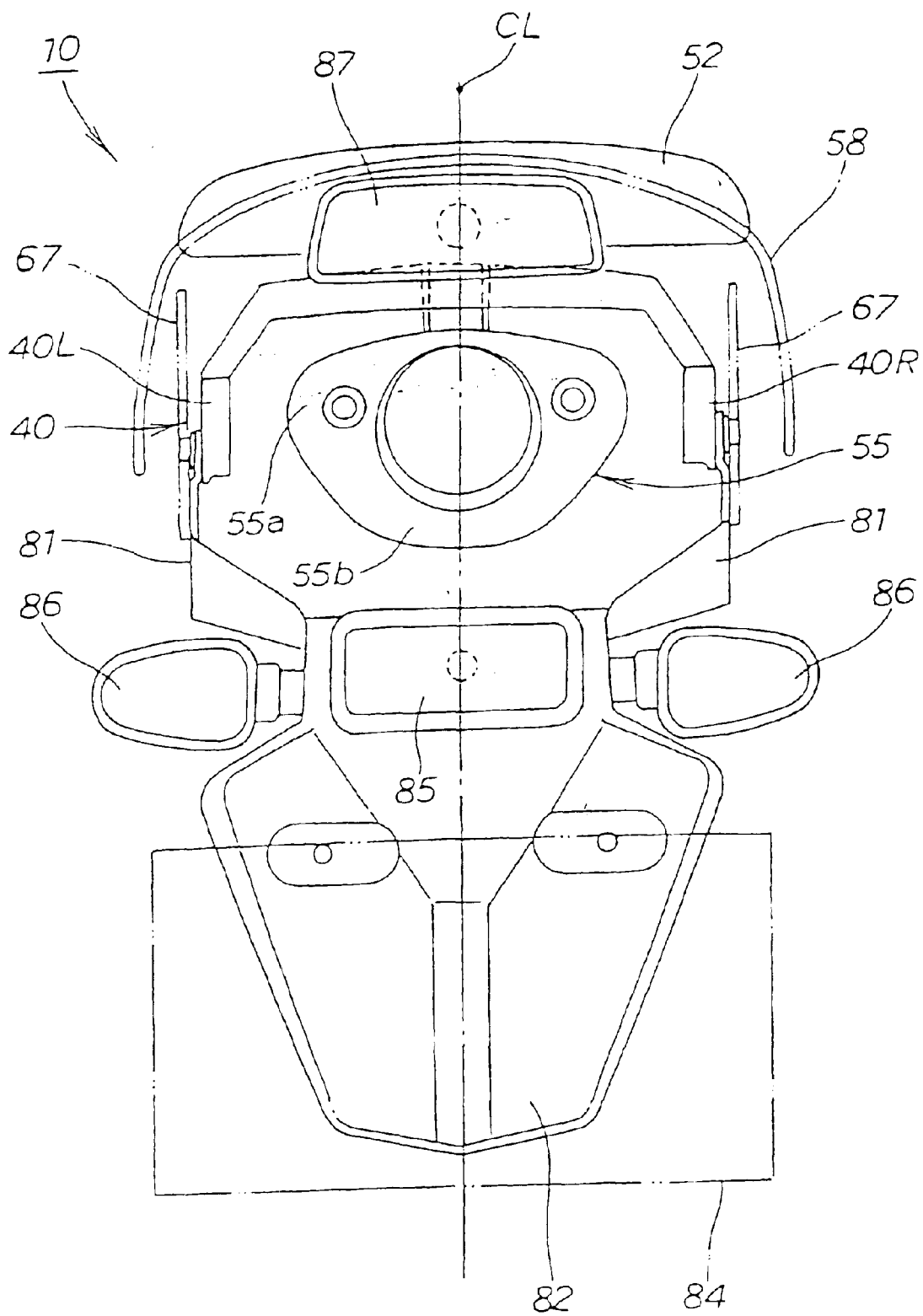
FIG. 9 A back view showing the vicinity of a seat rail, a rear seat and a muffler according to the invention.

FIG. 8 is a cross-sectional view which observes the vicinity of the rear seat according to the invention from the left side, and FIG. 9 is a back view of the vicinity of the seat rail, the rear seat and the muffler according to the invention. These drawing show that left and right stays 81, 81 extend downward from the left and right seat rails 40L, 40R (left and right rear frames 40L, 40R) and a rear fender 82 is mounted on these stays 81, 81.

To be more specific, the muffler 55 extends more rearward from the rear ends of the left and right seat rails 40L, 40R. The left and right stays 81, 81 which are fastened to the rear ends of the left and right seat rails 40L, 40R by bolts extend rearward and downward to a rear lower portion of the muffler 55 and upper left and right portions of the rear fender 82 are mounted on distal ends of the left and right stays 81, 81 by bolts.

The rear fender 82 is a member which is arranged below the muffler 55 and extends rearward and downward. The rear fender 82 includes a bracket 83 at a rear lower portion thereof and, at the same time, includes a license plate lamp 85 (a number plate lamp 85) at a rear upper portion thereof. The bracket 83 is a member for mounting a number plate 84. The license plate lamp 85 is an illumination lamp for illuminating the number plate 84.

By providing the number plate 84 and the license plate lamp 85 on the rear fender 82, it is possible to arrange the license plate lamp 85 at an optimum position for illuminating the number plate 84. Accordingly, visibility of the number displayed on the number plate 84 can be further enhanced.

The left and right stays 81, 81 are further provided with left and right rear winkers 86, 86 (see FIG. 9).

Further, the seat rail 40 (the left and right seat rails 40L, 40R) mounts a tail lamp 87 at a position higher than a position of the muffler 55. The tail lamp 87 is formed of a light emitting diode (LED) which is small-sized and has a relatively large thermal durability. Accordingly, the tail lamp 87 can be arranged in the vicinity of the muffler 55.

In this manner, by mounting the lamp 87 separate from the lamp 85 mounted on the rear fender 82 to the left and right seat rails 40L, 40R at the position higher than the position of the muffler 55, the lamps 85, 87 which are provided to the rear portion of the vehicle body can be arranged above and below the muffler 55 and hence, respective lamps 85, 87 can be made compact. Numeral 88 indicates a muffler hanger.

Here, to reduce the weight of the motorcycle 10 while enhancing the aesthetic appearance of the motorcycle 10, as shown in FIG. 9, in conformity with a shape of the rear portion of the vehicle body, the vicinity of the left and right stays 81, 81 and the vicinity of the rear fender 82 are made compact or small-sized. To be more specific, a width (size in the vehicle width direction) of an upper mounting portion of the rear fender 82, that is, a portion of the rear fender 82 which is mounted on the left and right stays 81, 81 is set equal to or smaller than a width of an upper portion 55a of the muffler 55. In such a constitution, by taking the aesthetic appearance and the like into consideration, the left and right stays 81, 81 are formed in a folded form such that a distance between the stays 81, 81 is narrowed as the left and right stays 81, 81 extend rearward.

On the other hand, the muffler 55, when viewed from the back side as in the case of FIG. 9, exhibits an approximately tapered shape in which an upper portion 55a thereof has a wide width and a lower portion thereof 55b has a narrowed width. A angle of this taper may substantially correspond to a narrowed angle of the stay 81, 81.

Due to such a constitution, it is possible to make gaps defined between the left and right seat rails 40L, 40R, the left and right stays 81, 81, and the rear fender 82 and the muffler 55 substantially uniform and hence, there is no fear that portions of the left and right seat rails 40L, 40R, the left and right stays 81, 81 and the rear fender 82 locally assume high temperature.

Further, the shape of the muffler 55 can be formed into an approximately tapered shape having a wide-width upper portion and a narrow-width lower portion in conformity with the shapes of the left and right seat rails 40L, 40R, the left and right stays 81, 81 and the rear fender 82 and hence, the muffler 55 can be easily arranged. Still further, since the shape of the muffler 55 is formed into the approximately tapered shape having the wide-width upper portion 55*a* and the narrow-width lower portion 55*b*, it is possible to sufficiently ensure a capacity (an inner capacity of an expansion chamber) of the muffler 55.

Naturally, the width of the muffler 55 and an interval between the stays 81, 81 are smaller than a width of a rear cowl portion of the cowl 58 indicated by an imaginary line. Accordingly, the aesthetic appearance of the motorcycle 10 is enhanced.

As can be clearly understood from the foregoing explanation, the muffler 55 is arranged between the left and right seat rails 40L, 40R (left and right rear frames 40L, 40R), below upper ends of the left and right seat rails 40L, 40R and above the rear wheel 57 (see FIG. 1). Further, the stays 81, 81 extend downward from the left and right seat rails 40L, 40R and the rear fender 82 which is arranged below the muffler 55 is mounted on these stays 81, 81. Accordingly, when the muffler 55 is viewed from the back thereof, the muffler exhibits the approximately tapered shape having the wide-width upper portion 55*a* and the narrow-width lower portion 55*b* whereby it is possible to make the shape of the muffler 55 match the shape of the rear portion of the vehicle body.

Accordingly, it is possible to easily arrange the muffler 55 and the rear fender 82. Further, in spite of the constitution that the muffler 55 is arranged between the left and right seat rails 40L, 40R and, at the same time, the rear fender 82 is arranged below the muffler 55, the rear cross member 49 spans above the left and right seat rails 40L, 40R whereby the rear seat 52 can be arranged above the rear cross member 49 and a person can ride thereon or a luggage can be stacked on the rear cross member 49. Further, the motorcycle 10 can be made compact and light-weighted and, at the same time, the aesthetic appearance of the motorcycle 10 can be enhanced.

As shown in FIG. 8, since the upper half portion of the muffler 55 is covered with the heat shielding plate 62, the heat shielding plate 62 is arranged above the seat rail 40 and the rear seat 52 is arranged above the heat shielding plate 62. It is possible to prevent heated air from being transferred from the muffler 55 to the rear seat 52 side by the heat shielding plate 62.

Further, a seat locking mechanism 90 (a seat engaging member 90) which is engaged with a front portion of the rear seat 52 is mounted on the rear cross member 49.

By making a rear end portion of the hook plate 68 catch the rear seat 52, the rear end portion of the rear seat 52 can be replaceably mounted on the seat rail 40 by the hook plate 68.

As mentioned above, the rear seat 52 mounted on the left and right seat rails 40L, 40R is arranged at the position higher than the position of the muffler 55 and has the width larger than that of the muffler 55 (see FIG. 9). Accordingly, it is possible to block heated air from the muffler 55 using the rear seat 52 having a wide width and hence, it is possible to further suppress rising of the heated air toward an occupant side.

The left and right stays 81, 81 run outside the muffler 55 in the vehicle width direction and are formed of a plate material having a relatively large width and directing a plate surface thereof in the vehicle width direction. Further, a distance (size in the vehicle width direction) between the left and right stays 81, 81 is set smaller than a width of a portion of the rear cowl of the cowl 58 indicated by the imaginary line. Accordingly, the stays 81, 81 play a role of heat shielding members.

As shown in FIG. 8, the heat shielding plate 62 is provided with an integrally-formed housing portion 62*a* below the rear seat 52. Articles such as a locking jig 69 can be stored in this housing portion 62*a*. The locking jig 69 is a theft prevention jig for locking a wheel at the time of parking. For example, the locking jig 69 is constituted of an approximately U-shaped locking lug and a locking rod which is inserted into a pair of legs of the locking lug.

Figure 10:
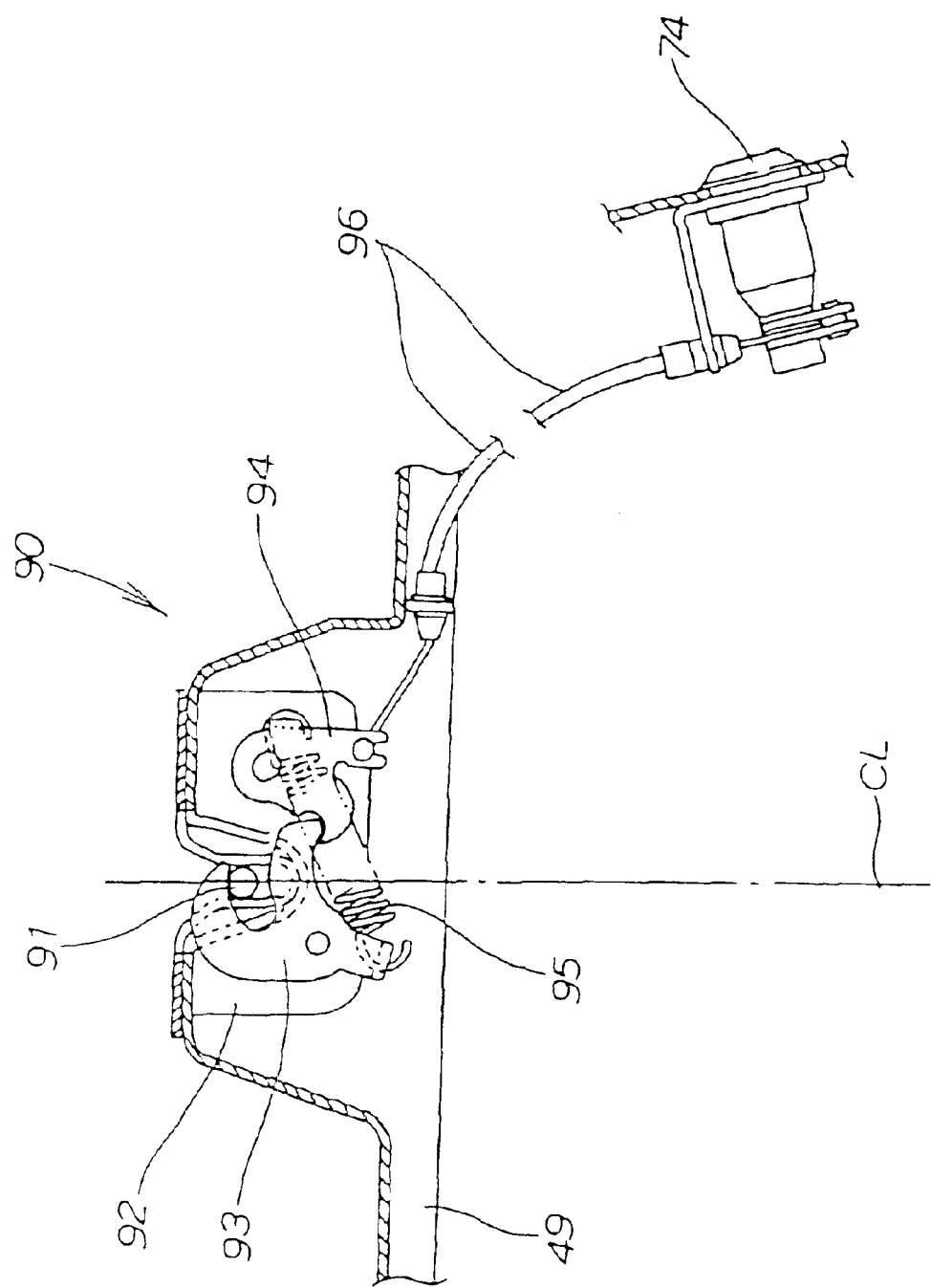
FIG. 10 A cross-sectional view viewing the vicinity of a seat locking mechanism according to the invention from a front side.

FIG. 10 is a cross-sectional view which views the vicinity of the seat locking mechanism according to the invention from a front side and shows that the seat locking mechanism 90 is mounted on the upper portion of the rear cross member 49.

The seat locking mechanism 90 constitutes a seat catching unit which locks an upwardly extending U-shaped striker 91 which is moved downward from the front lower portion of the rear seat 52 (see FIG. 8). Such a seat locking mechanism 90 includes a frame portion 92 which is mounted on the rear cross member 49, a hook 93 which is mounted on the frame portion 92 such that the hook 93 can be swung leftward and rightward, a latch member 94, and a tensile spring 95 which is extended between the hook 93 and the latching member 94.

The hook 93 constitutes a locking member for locking the striker 91. The latching member 94 constitutes a locking holding member which latches the hook 93 for maintaining the locked state between the hook 93 and the striker 91. The tensile coil 95 is a resilient member which exhibits resiliency to maintain the engaged relationship between the hook 93 and the latching member 94.

The latching member 94 and the key cylinder 74 are connected to each other by a Boden cable 96. With the releasing operation of the key cylinder 74, the latching member 94 and the hook 93 can be unlocked by way of the Boden cable 96.

Figure 11:
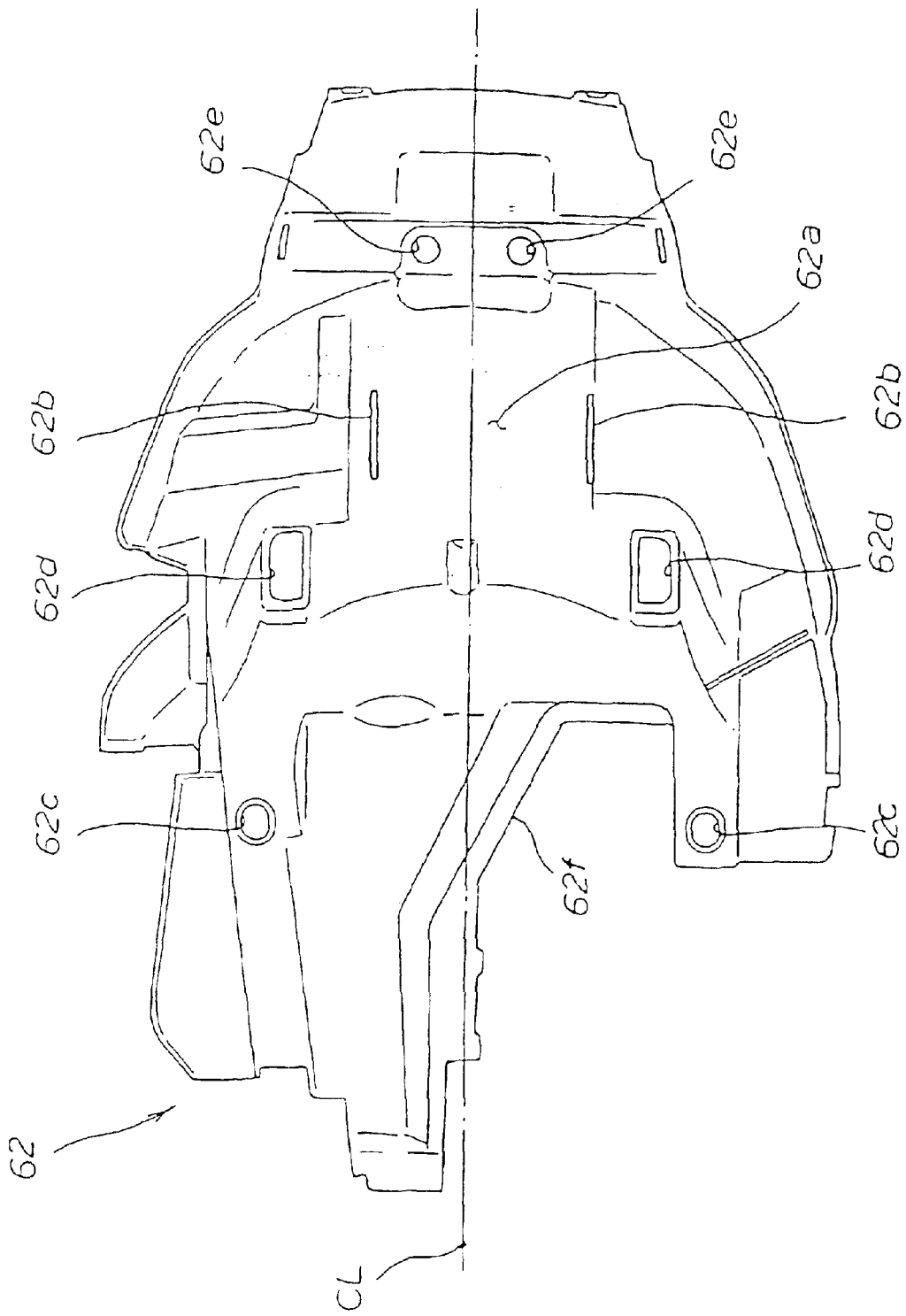
FIG. 11 A plan view of a heat shielding plate according to the invention.

FIG. 11 is a plan view of the heat shielding plate according to the invention and shows the entire structure of the heat shielding plate 62. The heat shielding plate 62 forms a housing portion 62*a* at a position close to a rear portion thereof and on the vehicle-width direction center CL, forms housing partition plates 62*b*, 62*b* at both left and right sides of the housing portion 62*a*, forms left and right front seat mounting holes 62*c*, 62*c* at a front portion thereof, forms left and right cross member mounting holes 62*d*, 62*d* at the fore-and-aft direction center portion, forms left and right hook mounting holes 62*e*, 62*e* at the rear portion, and forms a box mounting portion 62*f* which is largely cut out in the directions toward the front end and the left side.

To continue the explanation in conjunction with FIG. 6 to FIG. 8, the front seat mounting holes 62*c*, 62*c* are holes for mounting the rear portion of the front seat 51. The cross member mounting holes 62*d*, 62*d* are holes for mounting the rear cross member 49. The hook mounting holes 62*e*, 62*e* are holes for mounting the hook plate 68. The box mounting portion 62*f* is a hole for mounting the electric component housing box 71. By allowing bolts B6 (see FIG. 7) to pass through the front seat mounting holes 62*c*, 62*c*, the rear portion of the front seat 51 can be mounted on the left and right seat rails 40L, 40R.

In summary, as shown in the above-mentioned FIG. 6, FIG. 8, and FIG. 11, the heat shielding plate 62 for engine exhaust muffler overlaps the seat rail 40 from above, the hook plate 68 for mounting the rear portion of the rear seat 52 (the seat mounting member 68) and the rear cross member 49 overlap the heat shielding plate 62 from above, the heat shielding plate 62 and the hook plate 68 are fastened together to the seat rail 40 using bolts, and the heat shielding plate 62 and the rear cross member 49 are fastened together to the seat rail 40 using bolts.

That is, the heat shielding plate 62 and the hook plate 68 are fastened to the seat rail 40 using bolts in an overlapping manner. At the same time, the heat shielding plate 62 and the rear cross member 49 are fastened to the seat rail 40 using bolts in an overlapping manner.

Accordingly, it is possible to assemble the heat shielding plate 62, the hook plate 68 and the rear cross member 49 to the seat rail 40 with a simple operation and hence, the assembling operability can be enhanced.

The above explanation is summarized again based on FIG. 5. The seat engaging member 90 (see FIG. 10) is formed on the cross members 47 to 49 which can be mounted later on the left-and-right two-split seat rails 40R, 40L using the fastening members Bi to B4. Hence, it is no longer necessary to mount the seat engaging member 90 to the seat rails 40L, 40R. Accordingly, the shape of the seat rails 40L, 40R can be simplified and hence, molding by casting can be facilitated. By forming the seat rails 40L, 40R as the cast product, the left-and-right two-split seat rails 40L, 40R can be easily manufactured.

On the other hand, the cross members 47 to 49 are provided with only the seat engaging member 90 and hence, the shape of the cross members can be simplified. Accordingly, the cross member can be formed of a press molded product having a simple shape and hence, the cross member can be easily manufactured.

In this manner, the left-and-right two-split seat rails 40L, 40R and the cross members 47 to 49 which can be easily manufactured can be combined and integrally formed using fastening members and hence, the seat rail 40 can be produced more easily.

Further, since the seat rail 40 is constituted of left and right seat rails 40L, 40R which are divided with respect to the vehicle-width-direction center, the left and right seat rails 40L, 40R can be molded using split molds which can be respectively divided in the vehicle body width direction and hence, molding can be performed more easily.

Here, in the above-mentioned embodiment, the rear portion of the exhaust pipe 54 may be connected to the muffler 55 after being arranged close to the left rear frame 40L so as to ensure the space Sp in which the vehicle mounting parts 72, 74 are stored between the rear portion of the exhaust pipe 54 and the right side rear frame 40R.

Further, the vehicle mounting parts are not limited to the battery 72 and the key cylinder 74.

The invention can achieve following advantages due to the above-mentioned constitutions.

According to the first aspect of the present invention, since the seat engaging member is formed on the cross member which can be mounted on the left-and-right two-split seat rail later using the fastening member, it is no longer necessary to form the seat engaging member on the seat rail. Accordingly, the shape of the seat rail can be simplified and hence, molding by casting is facilitated. By forming the seat rail as a cast product, a left-and-right two-split seat rail can be easily manufactured.

On the other hand, the cross member is provided with only the seat engaging member and hence, the shape of the cross member can be simplified. Accordingly, the cross member can be formed of a press molded product having a simple shape and hence, the cross member can be easily manufactured.

In this manner, the left-and-right two-split seat rail and the cross member which can be easily manufactured can be combined and integrally formed using fastening members and hence, the seat rail can be produced more easily.

According to the second aspect of the present invention, the seat rail is constituted of left and right seat rails which are divided with respect to a vehicle-width-direction center. Hence, the left and right seat rails can be molded using a split mold which can be respectively divided in the vehicle body width direction, whereby molding can be performed more easily.

According to the third aspect of the present invention, since the heat shielding plate for engine exhaust muffler and the seat mounting member are fastened to the seat rail using bolts in an overlapping manner and the heat shielding plate for engine exhaust muffler and the cross member are fastened to the seat rail using bolts in an overlapping manner, the heat shielding plate, the seat mounting member and the cross member can be assembled to the seat rail with a simple operation. As a result, the assembling operability is enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat rail structure, comprising:
    a seat rail extending rearward from a vehicle body frame for supporting a seat, the seat rail being formed of a left-and-right two-split cast product having a substantially flat upper surface, the seat rail including at least one cross member, the at least one cross member being mountable using fastening members, the seat being arranged above the seat rail and the at least one cross member;
    a seat engaging member for engaging the seat being formed on the at least one cross member;
    a heat shielding plate for an engine exhaust muffler overlaps the seat rail from above; and
    a seat mounting member which mounts the seat thereon, or the at least one cross member overlapping the heat shielding plate for the engine exhaust muffler from above.

2. The seat rail structure according to claim 1, wherein the at least one cross member includes a front upper cross member, a lower front cross member, and a rear cross member.

3. The seat rail structure according to claim 1, wherein the seat rail is constituted of left and right seat rails which are divided with respect to a vehicle-width-direction center.

4. The seat rail structure according to claim 3, wherein the at least one cross member includes a front upper cross member, a lower front cross member, and a rear cross member.

5. The seat rail structure according to claim 4, wherein the left and right seat rails include rail mounting portions on front end portions thereof, fuel tank support portions formed behind the rail mounting portions, front upper connection portions and front lower connection portions formed behind the fuel tank support portions, rear connection portions formed behind the front lower connection portions, extension portions which extend toward the vehicle-width-direction center from the rear end portions, and flanges on distal end portions thereof, the flanges abutting each other.

6. The seat rail structure according to claim 5, wherein the front upper cross member overlaps between the front upper connection portions from above and is bolted to the front upper connection portions, both ends of the front lower cross member are sandwiched between the front lower connection portions and are bolted to the front lower connection portions, the rear cross member overlaps the rear connection portions from above and is bolted to the rear connection portions, and the flanges which abut to each other are bolted to each other.

7. The seat rail structure according to claim 1, wherein the heat shielding plate for engine exhaust muffler, the seat mounting member and the at least one cross member are fastened to the seat rail by bolts.

8. The seat rail structure according to claim 7, wherein the seat mounting member is a hook plate mounted on rear extended portions of the seat rail.

9. The seat rail structure according to claim 7, wherein the heat shielding plate forms a housing portion at a rear portion thereof and on the vehicle-width direction center, forms housing partition plates at both left and right sides of the housing portion, forms left and right front seat mounting holes at a front portion thereof, forms left and right cross member mounting holes at the fore-and-aft direction center portion, forms left and right hook mounting holes at the rear portion, and forms a box mounting portion which is largely cut out in the directions toward the front end and the left side.

10. The seat rail structure according to claim 9, wherein the seat may be locked over the housing portion, and articles may be securely stored in the housing portion under the seat.

11. A seat rail structure, comprising:
a seat rail for supporting a seat, the seat rail having front portions thereof overlapping a fuel tank and being attached to vehicle main pipes and extending rearwardly, the seat rail being formed of a left-and-right two-split cast product having a substantially flat upper surface,
wherein the seat rail includes an upper front cross member, a lower front cross member, and a rear cross member, each of the cross members being mountable using fastening members, the seat being arranged above the seat rail and at least one of the cross members, and a seat engaging member for engaging the seat being formed on at least one of the members,
wherein at least part of the upper front cross member is disposed directly above the lower front cross member.

12. The seat rail structure according to claim 11, wherein the seat rail is constituted of left and right seat rails which are divided with respect to a vehicle-width-direction center.

13. The seat rail structure according to claim 12, wherein the left and right seat rails include rail mounting portions on the front end portions thereof, fuel tank support portions formed behind the rail mounting portions, front upper connection portions and front lower connection portions formed behind the fuel tank support portions, rear connection portions formed behind the front lower connection portions, extension portions which extend toward the vehicle-width-direction center from the rear end portions, and flanges on distal end portions thereof, the flanges abutting each other.

14. The seat rail structure according to claim 13, wherein the front upper cross member overlaps between the front upper connection portions from above and is bolted to the front upper connection portions, both ends of the front lower cross member are sandwiched between the front lower connection portions and are bolted to the front lower connection portions, the rear cross member overlaps the rear connection portions from above and is bolted to the rear connection portions, and the flanges which abut to each other are bolted to each other.

15. The seat rail structure according to claim 11, wherein a heat shielding plate for engine exhaust muffler overlaps the seat rail from above, a seat mounting member which mounts the seat thereon or the cross member overlaps the heat shielding plate for an engine exhaust muffler from above, and the heat shielding plate for the engine exhaust muffler, the seat mounting member, and the cross members are fastened to the seat rail by bolts.

16. The seat rail structure according to claim 15, wherein the seat mounting member is a hook plate mounted on rear extended portions of the seat rail.

17. The seat rail structure according to claim 15, wherein the heat shielding plate forms a housing portion at a rear portion thereof and on the vehicle-width direction center, forms housing partition plates at both left and right sides of the housing portion, forms left and right front seat mounting holes at a front portion thereof, forms left and right cross member mounting holes at the fore-and-aft direction center portion, forms left and right hook mounting holes at the rear portion, and forms a box mounting portion which is largely cut out in the directions toward the front end and the left side.

18. The seat rail structure according to claim 17, wherein the seat may be locked over the housing portion, and articles may be securely stored in the housing portion under the seat.

19. A seat rail structure, comprising:
a seat rail extending rearward from a vehicle body frame for supporting a seat, the seat rail being formed of a left-and-right two-split cast product having a substantially flat upper surface, the seat rail including at least one cross member, the at least one cross member being mountable using fastening members, the seat being arranged above the seat rail and the at least one cross member;
a seat engaging member for engaging the seat being formed on the at least one cross member;
a heat shielding plate for an engine exhaust muffler overlaps the seat rail from above; and
a seat mounting member which mounts the seat thereon, or the at least one cross member overlapping the heat shielding plate for the engine exhaust muffler from above,
wherein the heat shielding plate for the engine exhaust muffler, the seat mounting member and the at least one cross member are fastened to the seat rail by bolts.

* * * * *